Patented Feb. 3, 1931

1,791,009

UNITED STATES PATENT OFFICE

IWAN OSTROMISLENSKY, OF NEW YORK, N. Y., ASSIGNOR TO L. A. VAN DYK, OF YONKERS, NEW YORK

METHOD OF OBTAINING VARIOUS POLYMERIZED VINYL CHLORIDE MODIFICATIONS

No Drawing.    Application filed November 2, 1925.  Serial No. 66,403.

This invention is an improvement in methods of obtaining the various soluble modifications (alpha, beta, delta, gamma) of polymerized vinyl chloride, or caouprenchloride, and particularly in methods of obtaining the beta modification.

In my prior application, Serial No. 45,098, filed July 21, 1925, a method of obtaining soluble modifications of polymerized vinyl chloride is set forth, and a process of converting the so obtained chloride into a plastic material suitable for use in making film supports, and molded articles of every character. In this process, the soluble modifications are obtained by subjecting vinyl chloride to the regulated action of light.

The present invention is directed to the obtaining of soluble modifications of polymerized vinyl chloride, or caoupren chloride, and more particularly the beta modification. When the vinyl chloride is subjected to the action of light, polymerization commences, the alpha modification being first formed. Later the alpha modification, or a portion thereof, is converted into the beta, and if the process is continued, the delta and gamma modifications are formed, the alpha and beta modifications, or a portion thereof being converted into the delta and gamma modifications.

The delta and gamma modifications are not suitable for some purposes the product is designed to serve, nor is the alpha modification as suitable as the beta for the manufacture of said products, such for instance as film supports, wherein the support must have durable flexibility and elasticity. Supports made from the alpha modification tend toward brittleness, and from a mixture of the modifications the product is brittle, lacks transparency, and gives a wavy surface.

Since in polymerization the tendency of the product is to pass progressively from the alpha to the beta, to the delta, to the gamma modification, it is obvious that if the polymerization is checked at the proper time, the polymers formed will be wholly of the soluble modifications. The alpha modification first formed and which has not been converted into beta may be removed by dissolving it in acetone. Since the beta modification is insoluble in acetone, it remains in the solution and may be recovered by dissolving it in chlorbenzol.

If the process be interrupted before the formation of the delta modification commences, the unchanged portion of the vinyl chloride may be evaporated, leaving the polymers which may be separated and isolated as above described. While the velocity of the polymerization depends on the nature of the light rays, the change from beta to delta and gamma may be hindered by the addition of a suitable solvent, that is by treating the vinyl chloride in a solution with the light. Suitable solvents are ether, ethyl or methylalcohol, symmetrical tetra chlorethane or chlorbenzol, and the like.

Since the delta and gamma modifications are insoluble in chlorbenzol, it provides a convenient index for determining when the conversion from beta to delta and gamma commences. That is when the forming polymers cease to be soluble in chlorbenzol, alpha and gamma polymers are forming, and if the process is interrupted at this moment, the product will be composed substantially wholly of alpha and beta modifications.

Another method of obtaining wholly chlorobenzol soluble modifications, is by treating the vinyl chloride in solution. The most soluble alpha modification seems to be in a condition of the highest chemical stability when preserved in ether. Therefore, ether is a preferred solvent for the vinyl chloride, insuring speedy and reliable production of the soluble modifications when polymerized in this solution.

Alcohols may also be used as solvents, as for instance, methyl alcohol, but the alpha modification obtained in this manner tends to change readily into the beta modification, and to assume a yellowish color, which for many purposes is objectionable. The solvents may be removed by evaporation.

Quite often the soluble modifications obtained by polymerization are converted into one of the insoluble modifications, gamma or delta at the moment when the soluble modification is separated from the mixture undergoing polymerization. This is true in the polymerization of free vinyl chloride, as well as of solution. However, the transformation at the point of isolation occurs only when the original vinyl chloride was not sufficiently pure, that is, when it contained admixtures, as for instance of various chlorides, which acting as catalysts tend to accelerate the successive transformation from alpha to beta to delta to gamma.

This conversion at the moment of separation may be prevented or inhibited by introducing into the mixture under reaction, before evaporation of the unchanged vinyl chloride, a solvent, such as chlorbenzol, tetrachloroethane, ether, ethyl or methyl alcohol, or the like. These substances not only preserve the soluble modifications in their soluble form, but as well remove the impurities above mentioned, such as chlorides which act as catalysts by solution.

The beta modification may also be obtained by conversion of the insoluble delta modification. The delta modification may be obtained by carrying on polymerization for a sufficient length of time, and it may be obtained somewhat more quickly by using incompletely purified vinyl chloride, without solvents. That is, the raw vinyl chloride not purified by fractional distillation, but with only the gaseous admixtures removed is used.

These admixtures, particularly acetylene, should be removed, since otherwise they cause a considerable increase of pressure in the polymerization apparatus. Vinyl chloride of this character will contain a small quantity of admixtures of high boiling point (halogen compounds), and the catalysts which accelerate the change to alpha to beta to delta to gamma.

I have also discovered that by careful continuous heating of the alpha modification, either in solution or pure, to a temperature such as 50° to 135° C., the alpha modification is converted into the beta. Also a sufficiently continuous exposure to light, as for instance, the ultra-violet rays of a mercury quartz lamp, or the rays of an electric arc (carbon, etc.) will convert the alpha into the beta modification. If the heating, or the subjection to light, or both together, of the original alpha modification is continued for a considerable period of time, the first formed beta modification will first be converted into delta and later into the gamma modications.

The insoluble modifications above mentioned (delta and gamma) may be transformed into the beta by means of those solvents which partially react chemically upon the caouprenchloride. Among these are various amines, such as aniline oil, pyridine, lutidine, toluidines, xylidines and the like are also suitable for the purpose. Such nitro compounds, as for instance, nitrobenzol, and other compounds such as acetophenone and the like are also very useful for this purpose, and are capable of converting the insoluble modifications into the soluble.

In using aniline, for instance, it is added to the mixture until a solution is obtained.

When the insoluble modifications are treated with any of the substances above indicated, the delta modification is converted into the beta. That the product is the beta modification and not the alpha may be demonstrated by treating the solution with alcohol, which precipitates the caouprenchloride, and the precipitate is readily soluble in chlorobenzol, but not in acetone. Hence, the reaction provides a convenient process of obtaining the beta modification, by transformation of the delta. In order to purify the product and remove pigmenting mixtures, the precipitate should be thoroughly washed in alcohol.

The treatment of the insoluble modifications with aniline and the like is in the usual manner, the reagents being mixed, preferably with some increase in temperature.

If in any reaction a mixture of soluble and insoluble modifications should appear, they may be readily separated by filtration through a suitable medium, or by centrifugal action. The different modifications of polymerized vinyl chloride or caoupren chloride are distinguished from each other not only by various properties of solubility, but also by many differences in physical properties. For instance, the delta modification, while insoluble is capable of swelling in various substances, as for instance, tetrachloroethane, chlorbenzol, ethyl benzoate, and aniline. While the insoluble modifications make a strong and colorless sheet, for instance, the surface is usually rippled and with local inflations or tubercles. The beta modification is particularly adapted for the making of sheets or strips in that it provides a very flexible elastic strip or sheet and with a non-light-refracting surface. The alpha modification is chiefly useful in the manufacture of celluloid and ebony-like products.

When making film supports from caoupren chloride with a halogen compound, I have discovered that the plastic properties are greatly improved by the introduction of alpha and beta chloronaphthalenes or their mixtures; by symmetrical tetrachloroethane; or by dichlorobenzol. The alpha chloronaphthalene or the di-chlorobenzols may be introduced into the solution in comparatively small quantities, or they may be used in the process of making films as the solvents, either with or without other halogen compound.

I have discovered that the beta modification prepared by means of a chlorbenzol solvent when made into film support absorbs a quite substantial quantity of the solvent; yet when said supports contain 50% or more of the solvent, they possess very valuable plastic properties. However, the films prepared from solutions of caoupren chloride in pure monochlorbenzol tend to dry out in the course of time, and thus become brittle. Therefore, it is necessary to introduce into such solutions small quantities of such compounds, as for instance, di-chlorobenzol, alpha chloronaphthalene, acetophenone, etc.

To simplify the making of film support, it is advisable to polymerize the vinyl chloride in solution with a solvent used in manufacturing of films, as for instance, chlorbenzols or symmetrical tetrachloroethane, and the like. Very good film supports may be obtained even from very weak solutions of beta modification, such for instance, as 6% to 30%.

The alpha modification is the most suitable for making ebonies because it gives a homogeneous structure which has very high tensile strength. The beta modification is suitable for ebonies, as well as for films. The delta and the gamma modifications, while unsuitable for films, are suitable for ebonies, but do not give so perfect products as the alpha modification. The tensile strength is not so great, and the structure is not so homogeneous.

The following table shows the reactions of the various modifications in the presence of various solvents:—

| Solvent | Alpha | Beta | Delta | Gamma |
|---|---|---|---|---|
| Xylol | Slightly soluble | Swells | Swells slightly | |
| Chloroform | Dissolves | Do | | |
| Ethylene di-chloride | Do | Do | Swells slightly | |
| Tetrachloroethane | Dissolves easily | Dissolves | Swells rapidly | |
| Chlorobenzol | Dissolves easily | Dissolves | Swells rapidly | |
| Chloroacetone | Do | Do | | |
| Di-chloroacetone | Dissolves easily | Dissolves easily | Swells | |
| Orthochlorophenol | Dissolves easily | Dissolves | Swells | |
| Styrol | Dissolves | Slightly dissolves | | |
| Benzyl chloride | Dissolves | Dissolves | Swells | |
| Chloronaphthalene | Dissolves | Dissolves | Swells | Insoluble in any |
| Acetone | Dissolves | Insoluble | Swells | |
| Ethyl-methylketone | Dissolves easily | Dissolves slightly | | |
| Acetophenone | Dissolves easily | Dissolves easily | Swells rapidly | |
| Ethylacetal | Slightly dissolves | | | |
| Ethyl-acetoacetate | Dissolves easily | Dissolves easily | Swells | |
| Ethylbenzoat | Dissolves easily | Dissolves easily | Swells rapidly | |
| Chloral | Dissolves easily | Dissolves | | |
| Benzaldehyde | Dissolves | | | |
| Pyridine lutidine | Dissolves easily | Dissolves easily | Swells | |
| Benzylaniline | Dissolves | Dissolves | Swells | |
| Aniline | Dissolves easily | Dissolves easily | Swells rapidly | |
| Nitrobenzol | Dissolves easily | Dissoves easily | Swells | |
| Trichloroethylene | Dissolves | Slightly dissolves | | |
| Glycol-di-acetate | Dissolves | Dissolves | | |
| Anisole | Dissolves | Dissolves | | |

In my first experiments with polymerizing vinyl chloride, I discovered the existence of two modifications, and described the same. These modifications I described as alpha and gamma, respectively, the former being soluble and the latter insoluble. Later I discovered two other modifications between the alpha and gamma, so far as regards solubility and order of appearance. Necessarily, these modifications were designated as beta and delta. Hence the designations of the modifications, so far as concern solubility and order of appearance, do not hold their usual order as found in the Greek alphabet.

I claim:

1. In the polymerization of vinyl chloride by exposure to light, the step which consists in interrupting polymerization by cutting off the light prior to the conversion of the earlier formed chlorobenzol soluble modifications into the insoluble.

2. In the polymerization of vinyl chloride by light, the steps which consist in adding to the vinyl chloride a solvent acting to hinder the conversion of the first formed chlorobenzol soluble modification into the insoluble and in cutting off the light at a selected time prior to such conversion.

3. In the polymerization of vinyl chloride by light, the steps which consist in adding to the vinyl chloride a halogen compound acting to hinder the conversion of the first formed chlorobenzol soluble modification into the insoluble and in cutting off the light at a selected time prior to such conversion.

4. In the polymerization of vinyl chloride by light, the steps which consist in adding to the vinyl chloride chlorobenzol acting to hinder the conversion of the first formed chlorobenzol soluble modification into the insoluble and in cutting off the light at a selected time prior to such conversion.

5. The method of completely converting vinyl chloride into chlorobenzol soluble polymers which consists in exposing the vinyl chloride to light, removing the first formed chlorobenzol soluble polymers with chlorobenzol, adding aniline to the remaining precipitate and washing in alcohol.

6. The process of obtaining chlorobenzol soluble modifications of polymerized vinyl chloride by treatment with light, which consists in interrupting the treatment by cutting off the light prior to complete polymerization, and evaporating the unchanged vinyl chloride.

7. In the polymerization of vinyl chloride by exposure to light, the method of obtaining a product composed wholly of beta polymers, which consists in removing the alpha modification with acetone and heating to convert the alpha into the beta, removing the beta polymers with chlorobenzol, adding aniline to the remaining precipitate, and washing with alcohol.

8. In the polymerization of vinyl chloride, the process of converting the alpha modification into the beta, which consists in careful continuous heating the alpha modification to a temperature of about from 50° to 135° C. until conversion is complete.

9. The process of producing chlorbenzol soluble polymerized vinyl chloride by treatment with light, which consists in the exposure of the chloride to light during a selected period, dissolving the polymers in aniline oil, and removing the oil by washing.

10. The process of converting insoluble modifications of polymerized vinyl chloride into chlorobenzol soluble modifications, which consists in adding aniline to the insoluble modifications.

11. The method of obtaining the beta modification of polymerized vinyl chloride, which consists in polymerizing the vinyl chloride until the delta modification is formed, and converting the delta into the beta modification by adding aniline.

12. The method of obtaining the beta modification of polymerized vinyl chloride, which consists in polymerizing the vinyl chloride, until the delta modification is formed, converting the delta into the beta modification by adding aniline, precipitating with alcohol, and dissolving in tetrachloroethane.

Signed at New York city, in the county of New York and State of New York, this 30th day of October, A. D. 1925.

IWAN OSTROMISLENSKY.